(12) United States Patent
Pearce

(10) Patent No.: US 11,601,440 B2
(45) Date of Patent: Mar. 7, 2023

(54) METHOD OF DETECTING AN EMAIL PHISHING ATTEMPT OR FRAUDULENT EMAIL USING SEQUENTIAL EMAIL NUMBERING

(71) Applicant: William Pearce, Toronto (CA)

(72) Inventor: William Pearce, Toronto (CA)

( * ) Notice: Subject to any disclaimer, the term of this patent is extended or adjusted under 35 U.S.C. 154(b) by 143 days.

(21) Appl. No.: 16/399,321

(22) Filed: Apr. 30, 2019

(65) Prior Publication Data

US 2020/0351275 A1 Nov. 5, 2020

(51) Int. Cl.
*H04L 9/40* (2022.01)
*G06F 16/21* (2019.01)
*H04L 51/42* (2022.01)

(52) U.S. Cl.
CPC .......... *H04L 63/126* (2013.01); *G06F 16/219* (2019.01); *H04L 51/42* (2022.05); *H04L 63/1416* (2013.01); *H04L 63/1483* (2013.01)

(58) Field of Classification Search
CPC . H04L 63/126; H04L 63/123; H04L 63/1416; H04L 63/1483; H04L 51/22; H04L 51/42; G06F 16/219
USPC .......................................................... 726/23
See application file for complete search history.

(56) References Cited

U.S. PATENT DOCUMENTS

| | | | | |
|---|---|---|---|---|
| 6,507,866 B1 * | 1/2003 | Barchi | ................ | H04L 63/0263 709/225 |
| 8,291,065 B2 * | 10/2012 | Goodman | ........... | H04L 63/1483 709/224 |
| 8,528,079 B2 * | 9/2013 | Wang | .................. | H04L 63/1441 726/22 |
| 9,026,597 B1 * | 5/2015 | Emigh | .................. | H04L 1/1635 709/206 |
| 9,800,610 B1 * | 10/2017 | Lu | ........................ | H04L 63/1416 |
| 2003/0204569 A1 * | 10/2003 | Andrews | ................ | H04L 51/12 709/206 |
| 2005/0132012 A1 * | 6/2005 | Muller | .................. | H04L 51/066 709/206 |
| 2006/0101120 A1 * | 5/2006 | Helsper | ............... | H04L 63/1483 709/206 |
| 2007/0101423 A1 * | 5/2007 | Oliver | .................... | H04L 63/123 726/22 |
| 2007/0115812 A1 * | 5/2007 | Hughes | ................. | H04L 1/1838 370/229 |

(Continued)

OTHER PUBLICATIONS

Resnick, "Internet Message Format", RFC 5322, 2008 (Year: 2008).*

*Primary Examiner* — Nam T Tran
(74) *Attorney, Agent, or Firm* — Elias C. Borges

(57) ABSTRACT

Herein is disclosed a method of verifying the authenticity of emails sent from a first email application of a sender to a second email application of a recipient, the emails each having a sender's email address, a receiver's email address, and a user accessible field for receiving content. The content of the user accessible field is visible to the recipient upon opening an email inbox in the second email application. The method includes the steps of first identifying the receiver for an email to be sent by the sender. A current sequence marker for the receiver is then generated. The current sequence marker represents a next sequence identifier in a sequence of emails between the sender and the receiver. The current sequence marker is then inserted into the user-accessible field of the email and the email is then sent.

8 Claims, 1 Drawing Sheet

(56) References Cited

U.S. PATENT DOCUMENTS

| | | | |
|---|---|---|---|
| 2007/0143407 A1* | 6/2007 | Avritch | H04L 63/123 |
| | | | 709/206 |
| 2007/0299920 A1* | 12/2007 | Crespo | G06Q 30/0603 |
| | | | 709/206 |
| 2011/0072090 A1* | 3/2011 | DeLuca | H04L 51/16 |
| | | | 709/206 |
| 2012/0227104 A1* | 9/2012 | Sinha | H04L 51/12 |
| | | | 726/22 |
| 2013/0198819 A1* | 8/2013 | Gordon | H04L 63/10 |
| | | | 726/5 |
| 2016/0006760 A1* | 1/2016 | Lala | H04L 63/1416 |
| | | | 726/23 |
| 2016/0021091 A1* | 1/2016 | Hoyer | H04L 9/321 |
| | | | 726/9 |
| 2016/0147782 A1* | 5/2016 | Roseman | G06Q 20/36 |
| | | | 707/822 |
| 2017/0345003 A1* | 11/2017 | Spears | H04L 63/102 |
| 2018/0114001 A1* | 4/2018 | Jain | G06F 21/31 |
| 2020/0396195 A1* | 12/2020 | Goel | H04W 12/0023 |

* cited by examiner

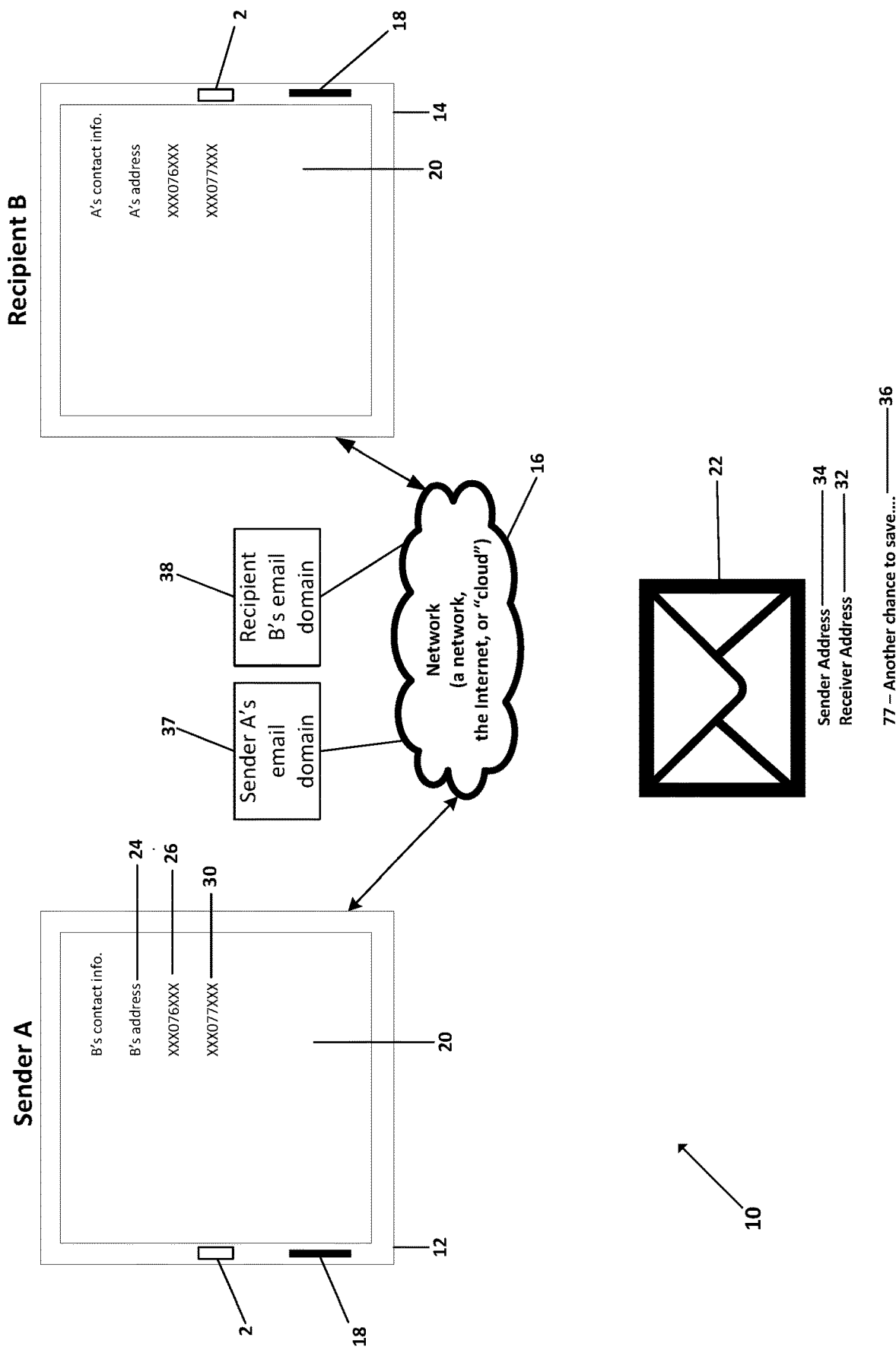

METHOD OF DETECTING AN EMAIL PHISHING ATTEMPT OR FRAUDULENT EMAIL USING SEQUENTIAL EMAIL NUMBERING

BACKGROUND OF THE INVENTION

Bulk electronic mail ("email") senders such as banks, financial institutions, utility companies, retailers, and other companies and organizations send a steady stream of email communications to their client bases. Similarly, email service providers ("email domains"), facilitate the hosting and the forwarding and exchange of email between each other for their email address bases.

It is beneficial for bulk email senders and email service providers to assist their client bases with identifying fraudulent emails and help them not be deceived by emails that appear to be legitimate but that are actually phishing attempts, spear-phishing attempts, or other fraudulent emails originating from bad actors with nefarious intents and purposes, such as (i) emails with a forged sender address that is spoofed to appear to come from another email sender, or (ii) clone phishing attempts where an attachment or website link within an email is replaced with a malicious version of the email that claims to be a resend of the original or an updated version to the original, or (iii) other email phishing and fraudulent email attack techniques. An innovation that would assist in identifying potential phishing attempts and fraudulent emails among bulk senders, email service providers, and their clients would be a benefit. Any email sender would benefit from this innovation, but bulk email senders, in particular, would benefit by increasing the chances that their client base would open emails, since very often emails go unopened if the end user clients are uncertain whether a given email is safe to open.

SUMMARY OF THE PRESENT INVENTION

The present invention overcomes the disadvantages of the prior art by providing a method of verifying the authenticity of emails sent from a sender to a receiver by verifying the sequential history of the email correspondence between the parties. The emails each have a sender's email address, a receiver's email address, and a user-accessible field such as the subject field. The method of the present invention includes the steps of Identifying the receiver for an email to be sent by the sender and then generating a current sequence marker for the receiver. The current sequence marker represents a next predicted sequence identifier in a sequence of emails between the sender and receiver. For example, if the sequence of emails between the sender and receiver includes 76 messages and the sequence marker is configured to be a numeric integer, then the last sequence identifier used would be 76 and the next sequence identifier (76+1 or 77) would result in the current sequence marker being 77. However, if the sequence identifiers comprise alphabetical characters (AA, AB, AC, etc.) and the last sequence identifier used was AG, then the next predicted sequence identifier would be AH, hence the current sequence marker would be AH. The next step in the method is to insert the current sequence marker into the user-accessible field of the email and then sending the email to the recipient. Preferably the sequence marker is formed from a sequence of alphanumeric characters which are human readable. Preferably the sequence marker is inserted into the subject line of the email allowing the receiver to verify the presence and veracity of the sequence identifier without having to open the email.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1 is a schematic view of the system of the present invention showing the system of the present invention being used to send an email from a Sender A to a Recipient B.

In the drawings like characters of reference indicate corresponding parts in the different figures.

DETAILED DESCRIPTION OF THE INVENTION

Referring to FIG. 1, the system of the present invention, shown generally as item 10, consists of two email-capable computing devices 12 and 14 in communication with each other via a network 16. Network 16 could be a telecom network or cellular data network or a local area network, but for most practical applications, network 16 is the internet.

Network 16 is capable of facilitating Simple Mail Transfer Protocol (RFC-5321) for email using Transmission Control Protocol ("TCP"), or other standards or proprietary methods of transporting email, that can send Sender A's email 22 to Sender A's email domain 37. Sender A's email domain 37 then forwards Sender A's email 22 via Network 16, again using Simple Mail Transfer Protocol or other standards or proprietary methods of transporting email, to Recipient B's email domain 38, where it may reside or be made available via network 16 to Recipient B's email application 18 via Network 16 using Post Office Protocol RFC-1939 ("POP3"), or using Internet Message Access Protocol RFC-3501 ("IMAP"), or using other standards or proprietary methods for transporting email.

Email addresses such samplename@exampledomain.com include a component on the right side of the @ symbol that signifies an internet email domain address that has servers and related applications or services configured for email hosting, forwarding, and exchange. Examples of Sender A's email domain 37 and Recipient B's email domain 38 include ".com" email domains such as Google's Gmail (e.g., sender@gmail.com), Microsoft's Hotmail (e.g., sender@hotmail.com), Zoho Mail (e.g., sender@zoho.com), Yahoo! Mail (e.g., sender@yahoo.com), and others; country-specific email domains such as Sympatico.ca, Hotmail.fr, and Yahoo.co.uk, and others; and other email domain servers and processes compliant with the respective RFC protocols and standards for email messaging.

Data source 20 contains data about email contacts, e.g., a bulk email sender's client base, and also contains data about the history of previously sent email messages. It is essential that data source 20 contains the contact information of recipients and be operative for the storage and retrieval of sequence identifier 26 for each recipient.

Within the present invention, data source 20 could be operative in several forms, including (i) a traditional relational database such as Microsoft SQL Server; or (ii) a delimited text file database containing the contact information of recipients and sequence identifier 26 for each recipient; or (iii) a data file containing the contact information of recipients and sequence identifier 26 for each recipient; or (iv) a record of previously sent emails (hereinafter referred to as the "email history") stored in their native format within, or otherwise accessible by Sender A, Sender A's email application 18, and process 2; or (v) some other record of, or copy of, the email history that contains the contact information of recipients and sequence identifier 26 for each recipient.

Regardless of whether data source 20 is a traditional database, a data file, or an email history, it is accessible by and interoperable with the other components of the present invention, as described herein.

Data source 20 includes data about the components of previously sent emails from Sender A to email recipients, and may also include the full or partial text and other data (e.g., MIME types) that comprise previously sent emails, including (i) email header fields such as subject line 36 and recipient email address 24, and (ii) the message body of previously sent email messages.

Regardless of where data source 20 resides, or whether data source 20 is a traditional database or another form of accessible email history, its purpose is to contain information about previously sent emails, including the email addresses 26 of email recipients and sequence identifier 26 for each recipient, or next sequence marker 30 for each recipient, or both sequence identifier 26 and next sequence marker 30 for each recipient.

When used in the present invention, if data source 20 is an accessible email history of previously sent emails, the contact information of recipients and also sequence identifier 26 is retrievable or discernible. For example, by reading the email history, such as those found in a data folder of previously sent emails within email application 18 or located somewhere else on computing device 12, Sender A (manually) or process 2 (programmatically) could discern what the next sequence marker 30 would be.

Sender A's computing device 12 is a network-16-enabled device such as a desktop or laptop computer, a smartphone, tablet, smart TV, or another type of device. Computing device 12 could be a single device, a server, or a plurality of servers and devices, and is configured as a bulk email sender and uses email application(s) 18, and possibly also process 2, to send emails to clients such as Recipient B. Email application 18 may reside on the local computing device 12 or a local server, or be accessible via the network 16 (the "internet" or "cloud"). Computing device 12 and email application 18 also have access to a data source 20 (as a database or an accessible email history) that may reside on the local device 12, or a local server, or a local network, or somewhere within the cloud, or on the email sender's email domain 37. Regardless of where data source 20 resides, whether it takes the form of a traditional database or an accessible email history, or how data source 20 components are accessed, data source 20 is operatively coupled to email application 18.

In any arrangement of data source 20 (as a database or an accessible email history) and email application 18, computing device 12 is configured to send email message(s) 22 from Sender A to Recipient B, and more particularly between computing devices 12 and 14 which are operated or otherwise controlled by Sender A and Recipient B respectively.

Receiver B's computing device 14 is a network-16-enabled device such as a desktop or laptop computer, a smartphone, tablet, smart TV, or another type of device. Receiver B's computing device 14 has access to email application 18 which is (i) an email application such as Microsoft Outlook, or other application, that resides on computing device 14; or (ii) an internet-based or cloud-based email service such as Google's Gmail or Microsoft's Hotmail which is accessible by a web browser such as Google Chrome, Microsoft Internet Explorer, Mozilla Firefox, or Safari, or others; or (iii) a hybrid of the foregoing two approaches.

Names of email message recipients, email address(es) 24 and other relevant information about a plurality of contacts are stored in data source 20 (as a database or an accessible email history). Data source 20 is operatively coupled to sequence identifier 26. The function of sequence identifier 26 is to enumerate each email communication from Sender A to each of Sender A's individual recipient contacts and to maintain a component of data source 20 (as a database or an accessible email history) for each contact, such that every successive email from Sender A to each of its contacts is identified by the next value in a predictable sequence that is intuitively known and understood in the recipients' language and/or culture. In the example in FIG. 1, this predictable sequence consists of the standard Arabic whole numbers, and the number 76 represents the most recent sequence marker from the emails that have previously been sent from Sender A to Recipient B, and in this example the number 77 represents the next sequence marker 30 that would be used in a future email being sent from Sender A to Recipient B.

Since the present invention has been designed to facilitate human recognition and human convenience, in this embodiment Sender A's sequence identifier 26 for its email correspondence with Recipient B consists of a simple incrementing Arabic numerical sequence. (In the first email communication from Sender A to Recipient B, a starting email sequence number would have to be used. This starting sequence number could be the Arabic numeral 1 or could be another number used to start a sequence.) Recipient B may notice that the sequence marker for the most recent email correspondence was 76, and that, therefore, the sequence marker for the next legitimate and expected email from Sender A should be 77.

Alternative sequences from the sender's and recipient's language and culture would also operate effectively as other embodiments within the present invention: for example, Roman numerals, an alphabet, or a sequence derived from the words to a familiar poem or song. Another embodiment may utilize Multipurpose Internet Mail Extensions ("MIME") types. Many email applications 18 can now be augmented with MIME types to support multimedia messages, and therefore would be able to expand the range of potential sequence markers significantly: for example, pictures or icons could be used to display a recognizable sequence.

Internet Message Format ("IMF") has been developed in step with Simple Mail Transfer Protocol and is standardized in RFC-5322. IMF is the standard syntax defined by Internet Engineering Tash Force (IETF) for the message bitstream when moving email messages from one computing device to another. As such, it is highly adopted and interoperable with many toolsets and applications. RFC-5322 Section 2.2, Header Fields, states: "Header fields are lines beginning with a field name, followed by a colon (":"), followed by a field body and terminated by CRLF" and "Each header field is logically a single line of characters, comprised of the field name, the colon, and the field body."

In this embodiment of the present invention, bulk email senders also use process 2, which is an application or script used in conjunction with email application 18 to create and send emails to its client base.

Therefore, for the purposes of the present invention, the email application 18 that creates the single line of characters for the header field defined as "subject:" 36 (commonly referred to as the "subject line" of the email) would execute an alternative process 2 that programmatically inserts an appropriate next sequence marker 30 after the subject field name and colon that defines the header of subject line 36 and anywhere within the subject line 36. Thus, the next sequence marker 30 becomes embedded within and is part of email subject line 36.

In addition to placing the next sequence marker 30 within the subject line 36 of the email message, the next sequence marker 30 could be inserted anywhere within the portion of the email that is visible to the recipient upon opening the email inbox in application 18; that is, in the areas reserved, pursuant to the specifications in RFC-5322 (and other RFC specifications for transporting email), for the name of the sender (known as "name:") or near the beginning of the first text line of the body of the email.

Since in many email applications 18 the subject line 36 is immediately visible without the body of the email message being visible until the email message is actually opened, it is the best use of the present invention to have subject line 36 of the email be the location where the next sequence marker 30 would be inserted manually by Sender A using email application 18, or programmatically using process 2 and email application 18. Using the next sequential marker 30 in subject line 36 means it is easier for Recipient B to quickly and more easily identify a potential phishing attempt because Recipient B likely does not need to fully open email message 22 to see the next sequential marker 30.

Application 18 and process 2 are configured to send email messages from computing device 12 to computing device 14 by extracting information from data source 20 (as a database or an accessible email history) and using the extracted information to fill various fields in email 22 before sending the email. For example, the email address 24 for Recipient B is extracted from data source 20 and inserted into the destination email address field 32 in email 22.

In another embodiment of the present invention, Sender A manually reads information from data source 20 (as a database or an accessible email history) and manually fills in various fields in email 22, including using the next sequence marker 30 in the subject line 36 or in another part of the email, before sending the email using email application 18. Sender A could read the components of data source 20 (as a database or an accessible email history) to determine next sequence marker 30.

In another embodiment of the present invention, Sender A could rely on other methods to track sequence identifier 26 and next sequence marker 30 for Recipient B and other contacts, such as (i) simply using human memory to track these; or (ii) tracking these using a written paper record; or (iii) tracking these using another database, computer application, or computer file stored on computing device 12 or another device or system accessible by Sender A; or (iv) tracking these using another method. In this alternative embodiment, instead of relying on process 2 to programmatically insert next sequence marker 30, Sender A could manually insert the next sequence marker 30 into the subject line 36, or into another part of the email, to help detect and prevent email phishing attempts using sequential email numbering.

Email application 18, using process 2, also automatically inserts Sender A's name ("sender's name:" as defined in RFC-5322 and other protocols for transporting email) and email address 34 into the sender's email address field 34 ("Sender:" as defined in RFC-5322 and other protocols for transporting email) 34 and the original subject text of the email into the "subject:" 36 field. In an alternative embodiment of the present invention, Sender A would manually insert the data for these email fields while constructing the email message using email application 18.

Applications 18, process 2 and data source 20 (as a database or an accessible email history) then operate together to retrieve the last sequence identifier 26 for that recipient from the components in data source 20 and generate a new next sequence marker 30 by, in this embodiment, arithmetically increasing it by one from 76 to 77. Process 2 then updates the sequence identifier for Recipient B in data source 20, if appropriate, and stores or saves the sequence identifier 26, or next sequence marker 30; or both sequence identifier 26 and next sequence marker 30; or a marker, indicator or other data to represent or compute at a later time the value for either sequence identifier 26 or next sequence marker 30, or both; pending retrieval for the next email from Sender A to Recipient B.

Other database components in data source 20 about the history of previously sent emails from Sender A to Recipient B may also be stored in data source 20 (as a database or an accessible email history), along with the sequence identifiers and sequence markers; however, if data source 20 takes the form of an email history, then it might not be necessary to store or save information about sequence identifier 26 or next sequence marker 30 in the database components since the email history can simply be read when needed by Sender A or process 2 to determine what the sequence identifier 26 is and what the next sequence marker 30 will be.

When Sender A's email application 18 communicates to its host email domain 37, it may comply with IMF and SMTP, or it may use an alternate protocol, standard or proprietary method for transporting email. Alternatively, a web browser application may be used to communicate to an internet host that is coupled to an email domain 37. In either case, the precise communication method between application 18 and the sending host domain 37 and receiving host domain 38 is not material for the purposes of the present invention; however, when Sender A's host email domain 37 communicates with other email host domains or transmission agents, it must comply with IMF and SMTP.

Regardless of how Sender A's application 18 and Sender A's host email domain 37 communicate, as the email leaves its host domain by means of SMTP, a simple, stripped-down IMF email in US-ASCII characters will look similar to this, as an example:

Sender: senderA.address@sender.domain.com
Message-ID:
<000000000c5d058363538e@senderAdomain.com>
Date: Wed, 6 Mar. 2019 01:58:25+0000
Subject: Another chance to save with this special offer
From:   Bulk    Email   Sender   Name
<senderA.address@senderAdomain.com>
To: recipientB@recipientBdomain.com
Body: We have a great promotional offer for you. Visit us at www.senderdomain.com to learn more.

This above example, along with the examples below, is intended to show the header fields of a typical email message 22. These examples are presented in US-ASCII characters. RFC-5322 specifies that email "messages are made up of characters in the US-ASCII range of 1 through 127. There are other documents, specifically the MIME document series ([RFC2045], [RFC2046], [RFC2047], [RFC2049], [RFC4288], [RFC4289]), that extend this specification to allow for values outside of that range" (Section 2.1). Therefore, the present invention can utilize either US-ASCII characters, or the other data types or character sets in other standards that allow for values outside of the US-ASCII range of 1 through 127, to detect an email phishing attempt or fraudulent email using sequential email numbering If the next sequence marker 30 in the present invention has been applied (to the "subject:" line 36 in this example), the simple email IMF example will look like this as it leaves its host domain 37 by means of SMTP:

Sender: senderA.address@senderAdomain.com
Message-ID:
<000000000c5d058363538e@senderAdomain.com>
Date: Wed, 6 Mar. 2019 01:58:25+0000
Subject: 77—Another chance to save with this special offer
From: Bulk Email Sender Name
<senderA.address@senderAdomain.com>
To: recipientB@recipientBdomain.com
Body: We have a great promotional offer for you. Visit us at www.senderdomain.com to learn more.

In another example, the next sequence marker 30 in the present invention has been applied to the "subject:" line 36, but is not strictly at the beginning of the subject line:

Sender: senderA.address@senderAdomain.com
Message-ID:
<000000000c5d058363538e@senderAdomain.com>
Date: Wed, 6 Mar. 2019 01:58:25+0000
Subject: Another chance to save with this special offer—77
From: Bulk Email Sender Name
<senderA.address@senderAdomain.com>
To: recipientB@recipientBdomain.com
Comment: We have a great promotional offer for you. Visit us at www.senderdomain.com to learn more.

This example demonstrates that the next sequential identifier 30 could be inserted within the subject line 36 immediately after the header ("Subject:") or anywhere within the subject line 36, including in the middle or at the end of the subject line 36. The next sequence marker 30 is thus added to the original text intended for the "subject:" line 36 and the combined text is inserted into the "subject:" line 36. The next sequence marker 30 could be at the beginning of the text of the subject line, anywhere within the subject line text, or at the end of the subject line text, as demonstrated in the following three examples: (i) Subject: 77—Another chance to save with this special offer; (ii) Subject: Another chance to save with this special offer—77; and (iii) Subject: Another chance—77—to save with this special offer.

The present invention inserted next sequence marker 30 into the email subject line 36, programmatically by process 2, when email message 22 was created by Sender A with the interoperable data source 20 (as a database or an accessible email history) and email application 18. In another embodiment of the present invention, Sender A could have determined the next sequence marker 30 by referencing the components in data source 20 and manually creating an email message using email application 18 (without using process 2) and manually inserting the next sequence marker 30 within the subject line 36. In further embodiments, other applications could have intercepted the email at a later stage and inserted the next sequence marker 30 programmatically, prior to the email leaving the host domain 37 for transmission to the recipient, if no sequence marker 30 was found in the subject line 36 or in another email message header field, message body, or any other part of the email message.

Furthermore, the next sequence marker 30 is not limited to being in subject line 36 and so it could be placed: (i) anywhere within the sender's name field ("Sender:") which, as described in RFC-5322, Section 3.4, is an email header field for "an optional display name . . . (which can be a person or a system) that could be displayed to the user of a mail application"; or (ii) somewhere within the beginning of the body of the email message, because often this area is used for preview text (e.g., where the first few characters of the email body are visible without opening the full email message); or (iii) in other areas within the body field of the email message, such that the human user (in this case Recipient B) would be assisted to recognize and comprehend the significance of the sequence identifier within his email inbox without requiring any other process; or (iv) in any other part of the email message, whether visible or invisible to the human end-user, including in required header fields, or in optional header fields, or in the body of the email message, so long as inclusion of the next sequence marker 30 in a given location does not interfere with the syntax or other requirements of the email message components, and does not materially interfere with the proper functioning of email messaging using the RFC-5322 protocol and other strandards for transporting email; or (v) into a separate, custom application, whether proprietary or sourced from a third party, that has been configured to meet the email sending needs of bulk emailers.

All of these placement locations for next sequence marker 30 are suitable for use with RFC-5322 since the protocol allows for substantial customizability and extensibility since "The only required header fields are the origination date field and the originator address field(s). All other header fields are syntactically optional" (Section 3.6) and, furthermore, "This specification is not intended to dictate the internal formats used by sites, the specific message system features that they are expected to support, or any of the characteristics of user interface programs that create or read messages. In addition, this document does not specify an encoding of the characters for either transport or storage" (Section 1.1).

Although the next sequence marker 30 could be inserted anywhere within the email 22, as described above, if the next sequence marker 30 were located within subject line 36, this would be in keeping with the RFC protocols and related standards for email messaging: as set forth in RFC-5322, Section 3.6.5, the subject line 36 is "intended to have only human-readable content with information about the message" and so acts an appropriate container for next sequence marker 30 and allows the present invention to function properly without deviating from RFC-5322 and related standards for transporting email messages.

The present invention assists its human users in recognizing and understanding the significance of sequence identifier 26 and sequence marker 30 (which in this embodiment are similar to page numbers). Once the human user has recognized or learned of the significance of the sequence identifier(s), no further or prior specialized knowledge is required.

Recipient B may be assisted in understanding that an email purporting to be from Sender A but that is lacking either the correct next sequence marker 30 or any sequence marker at all may be a phishing or fraud attempt and should be considered to be suspicious and worthy of further investigation. This assistance could come if some combination of email application 18, data source 20 (as a database or an accessible email history) and process 2 alerted Recipient B if the next sequential marker 30 that was received as part of email message 22 does not match the expected sequential identifier; that is, if the sequence is out of order. Email application 18, interoperating with other components, could, for example, change the email message to a different colour, alert Recipient B using an on-screen message on computing device 14, or otherwise provide a notification to Recipient B that an email may be a potential email phishing attempt and should be treated as a suspicious email message. Recipient B could also instead manually compare the next sequence marker 30 to sequence identifier 26 to determine whether an email is a potential phishing or fraud attempt.

The present invention thus allows Recipient B, a client of a bulk email sender, to detecting email phishing attempts, or other fraudulent emails, using sequential email numbering and the other components and processes of the present invention.

In another embodiment of the present invention, namely intercepting the email at the sender's email domain 37, the email domain 37 may insert the next sequence marker 30 if no sequence identifier is detected in a sender's email, thus providing the email domain's client base with the means to identify and prevent email phishing attempts.

In a further embodiment of the present invention, the process of the present invention could be applied to any email whatsoever, including any person, entity, or process (es) capable of sending email and embedding the next sequence marker 30 within the subject line 36 or any other part of the email message, include header fields and the body of the email message.

A specific embodiment of the present invention has been disclosed; however, several variations of the disclosed embodiment could be envisioned as within the scope of this invention. It is to be understood that the present invention is not limited to the embodiments described above but encompasses any and all embodiments within the scope of the following claims.

Therefore, what is claimed is:

1. A method of verifying the authenticity of emails sent from a sender to a recipient, the method comprising the steps of:

Providing a first email application for the sender and a second email application for the receiver, the emails each having a sender's email address, a receiver's email address, and a user accessible field for receiving content, the content of the user accessible field being visible to the recipient upon opening an email inbox in the second email application;

Identifying the receiver for an email to be sent by the sender;

generating a current sequence marker for the receiver, the current sequence marker representing a next sequence identifier in a sequence of emails between the sender and the receiver;

inserting the current sequence marker into the user-accessible field of the email and then sending the email to the recipient, and wherein the sender queries an email history to generate the current sequence marker, the email history representing a record of entails previously sent from the sender to the recipient, the sender then inserting the current sequence marker into the user accessible field before sending the email.

2. The method of claim 1 wherein the current sequence marker comprises one or more characters selected from the group of sequential characters comprising letters, numbers, words from a sequential list of words, symbols from a sequential list of symbols, icons from a sequential list of icons and images from a sequential list of images.

3. The method of claim 1 wherein the email history is contained in a database coupled to the first email application.

4. The method of claim 3 wherein the database and first email application are configured to programmatically generate the current sequence marker and insert it into the user accessible field before sending the email.

5. The method of claim 1 wherein the email history includes a last sequence marker for a last email sent to the recipient, the sender generating the current sequence marker by incrementing the last sequence marker by 1.

6. The method of claim 5 further comprising the steps of the recipient receiving the email sent by the sender, the current sequence marker being identified from the email, the current sequence marker then being compared to an expected sequence marker predicted from the last sequence marker, the email being flagged as suspicious if the current sequence marker identified from the email does not match the expected sequence marker.

7. The method of claim 1 wherein the user accessible field into which the current sequence marker is inserted is a subject field for the email.

8. The method of claim 1 wherein the current sequence marker is a human readable alphanumeric sequence of characters.

* * * * *